United States Patent Office 3,772,316
Patented Nov. 13, 1973

3,772,316
N,N'-METHYLENE-BIS(2-AMINO-1,3,4-THIADIAZOLE)
Osamu Wakae and Kunito Yakushiji, Kyoto, and Yoshiyuki Okada, Osaka, Japan, assignors to Takeda Chemical Industries, Inc., Osaka, Japan
No Drawing. Original application May 13, 1969, Ser. No. 824,251, now abandoned. Divided and this application July 27, 1970, Ser. No. 64,882
Claims priority, application Japan, May 13, 1968, 43/32,098; Sept. 2, 1968, 43/62,866; Apr. 14, 1969, 44/28,826
Int. Cl. C07d *91/62*
U.S. Cl. 260—306.8 D          1 Claim

ABSTRACT OF THE DISCLOSURE

Compounds of the formula

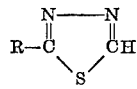

wherein R is amino, lower alkylamino having up to 5 carbon atoms, acyl amino having up to 18 carbon atoms, anilino, substituted or unsubstituted carbamoyl (or thiocarbamoyl) amino, nitrosoamino, nitroamino, lower alkoxymethylidenamino having up to 5 carbon atoms, substituted or unsubstituted phenoxy carbonylamino, substituted or unsubstituted benzene-sulfonamido, lower alkoxy carbonylamino having up to 5 carbon atoms, or a group represented by

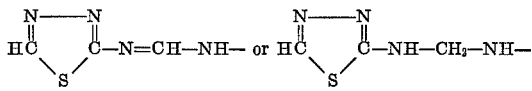

or

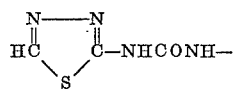

as well as acid addition salts thereof, are useful in combatting bacterial or fungal plant diseases. Compositions containing the active ingredients are provided.

---

This is a division of application Ser. No. 824,251 filed May 13, 1969, now abandoned.

This invention relates to fungicides, particularly, for combatting bacterial or fungal plant diseases (e.g. leaf blight of rice plant, citrus canker, tomato bacterial wilt, etc.), said fungicides containing a compound of the Formula I

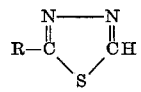    (I)

wherein R is amino, lower alkylamino having up to 5 carbon atoms, acyl amino having up to 18 carbon atoms, anilino, substituted or unsubstituted carbamoyl (or thiocarbamoyl) amino, nitrosoamino, nitroamino, lower alkoxymethylidenamino having up to 5 carbon atoms, substituted or unsubstituted phenoxy carbonylamino, substituted or unsubstituted benzene-sulfonamido lower alkoxy carbonylamino having up to 5 carbon atoms, or a group represented by

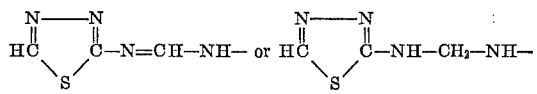

or

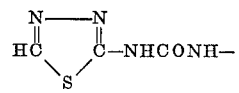

Hitherto, to control bacterial or fungal plant diseases, use has been made of copper compounds, antibiotics and the like, but no satisfactory results have as yet been reported, and to make the matter worse, those conventional agents tend to prove phytotoxic.

Therefore, it is the principal object of this invention to provide a fungicide for combatting bacterial or fungal plant diseases which exhibits both preventive and therapeutic effects against the infection of bacteria or fungi to plants, showing no substantial phytotoxicity.

Another object is to provide a fungicide which is hardly toxic against both human beings and animals as well as fish.

Further object is to provide a concentrate form of said fungicide, which is applicable, simply diluted at the use, to the host for the same purpose as mentioned just above, and which is more stable and more convenient in storage or transport than the diluted composition for the ready use to the plant.

Further object is to provide a systemic fungicide which shows a strong infiltrating action to plants.

Other objects will be apparent from the description detailed hereinafter in this specification.

As regards the above-mentioned Formula I, the loweralkylamino group is exemplified by methylamino, ethylamino, propylamino, butylamino and the like; and the acylamino group exemplified by aliphatic acylamino groups such as formamido, acetamido, propionamido, butanamido, pentanamido, decanamido, tetradecanamido, 9-octadecenamido, octadecanamido, chloroacetamido, β-carboxypropionamido, β-ethoxycarbonylpropionamido, β-butoxycarbonylpropionamido, etc. and substituted or unsubstituted aromatic acylamino groups such as benzamido, chlorobenzamido and the like. The substituted or unsubstituted carbamoylamino group includes, for example, ureido, 3 - methylureido, 3,3 - dimethylureido, 3-phenylureido, 3-(4-chlorophenyl)-ureido, etc.; while the substituted or unsubstituted thiocarbamoylamino group includes thioureido, 3-methylthioureido, 3-ethylthioureido, 3,3-dimethylthioureido, 3-phenylthioureido and the like. The lower alkoxymethylidenamino group is exemplified by methoxymethylidenamino, ethoxymethylidenamino, propoxymethylideneamino and the like. The substituted or unsubstituted phenoxy carbonylamino group includes, for example, phenoxycarbonylamino, 3 - methylphenoxycarbonylamino, 4 - methylphenoxycarbonylamino, 2-chlorophenoxycarbonylamino, 4 - chlorophenoxycarbonylamino, etc., while the lower alkoxycarbonylamino group includes isopropoxycarbonylamino, ethoxycarbonylamino, methoxycarbonylamino, and the like. The substituted or unsubstituted benzene sulfonamido group includes, for example, benzenesulfonamido, 4 - chlorobenzenesulfonamido and the like.

The 2-amino-1,3,4-thiadiazole compounds of General Formula I may be used in the form of acid addition salts. The salts may be such inorganic acid salts as the hydrochlorides, nitrates, thiocyanates, sulfates, etc. or such organic acid salts as oxalates, acetates, p-toluenesulfonates etc. Some representative 2-amino-1,3,4-thiadiazole compounds, accompanied by their melting points (M.P.) or decomposition temperatures (decp.), are shown below.

(1) 2-amino-1,3,4-thiadiazole, M.P. 191° C.
(2) 2-amino-1,3,4-thiadiazole hydrochloride monohydrate, M.P. 83°–84° C.

(3) 2-amino-1,3,4-thiadiazole oxalate,
M.P. 197°–198° C.
(4) 2-amino-1,3,4-thiadiazole thiocyanate,
M.P. 145°–146° C.
(5) 2-formamido-1,3,4-thiadiazole,
M.P. 220°–221° C.
(6) 2-acetamido-1,3,4-thiadiazole,
M.P. 268°–269° C.
(7) 2-propionamido-1,3,4-thiadiazole,
M.P. 229°–230° C.
(8) 2-(n-butanamido)-1,3,4-thiadiazole,
M.P. 179° C.
(9) 2-(isopentanamido)-1,3,4-thiadiazole,
M.P. 162°–163° C.
(10) 2-(n-decanamido)-1,3,4-thiadiazole,
M.P. 141°–143° C.
(11) 2-chloroacetamido-1,3,4-thiadiazole,
M.P. 185°–186° C. (decp.)
(12) 2-benzamido-1,3,4-thiadiazole,
M.P. 208°–209° C.
(13) 2-(p-chlorobenzamido)-1,3,4-thiadiazole,
M.P. 262°–263° C.
(14) 2-ethoxycarbonylamino-1,3,4-thiadiazole,
M.P. 198°–199° C.
(15) 2-(β-carboxypropionamido)-1,3,4-thiadiazole,
M.P. 170° C.
(16) 2-(β-ethoxycarbonylpropionamido)-1,3,4-thiadiazole, M.P. 229°–230° C.
(17) 2-ethylamino-1,3,4-thiadiazole,
M.P. 67°–71° C.
(18) 2-anilino-1,3,4-thiadiazole,
M.P. 171°–173° C.
(19) 2-ureido-1,3,4-thiadiazole,
M.P. 270° C.
(20) 2-(3-methylureido)-1,3,4-thiadiazole,
M.P. 226–227° C.
(21) 2-(3-ethylthioureido)-1,3,4-thiadiazole,
M.P. 217.5° C.
(22) 2-nitrosoamino-1,3,4-thiadiazole,
M.P. 221° C. (decp.)
(23) 2-nitroamino-1,3,4-thiadiazole,
M.P. 174°–175° C. (decp.)
(24) ethyl-N-(1,3,4-thiadiazol-2-yl)-formimidate,
M.P. 40°–41° C.
(25) N,N'-bis(1,3,4-thiadiazol-2-yl)-formamidine,
M.P. 240° C.
(26) N,N'-bis(1,3,4-thiadiazol-2-yl)-urea,
M.P. 280° C.
(27) N,N'-methylene-bis(2-amino-1,3,4-thiadiazole),
M.P. 197°–198° C.
(28) 2-tetradecanamido-1,3,4-thiadiazole,
M.P. 133.5°–134.5° C.
(29) 2-(9-octadecenamido)-1,3,4-thiadiazole,
M.P. 106°–107° C.
(30) 2-octadecanamide-1,3,4-thiadiazole,
M.P. 134°–135° C.
(31) 2-phenoxycarbonylamino-1,3,4-thiadiazole,
M.P. 239°–240° C.
(32) 2-(3-methylphenoxycarbonylamino)-1,3,4-thiadiazole, M.P. 224° C. (decp.)
(33) 2-(4-methylphenoxycarbonylamino)-1,3,4-thiadiazole, M.P. 224°–225° C. (decp.)
(34) 2-(2-chlorophenoxycarbonylamino)-1,3,4-thiadiazole, M.P. 196°–197° C.
(35) 2-(4-chlorophenoxycarbonylamino)-1,3,4-thiadiazole, M.P. 240° C. (decp.)
(36) 2-(3-methylthioureido)-1,3,4-thiadiazole,
M.P. 226° C.
(37) 2-(3-phenylthioureido)-1,3,4-thiadiazole,
M.P. 200° C. (decp.)
(38) 2-(4-chlorobenzenesulfonamido)-1,3,4-thiadiazole, M.P. 203°–205° C.
(39) 2-benzenesulfonamido-1,3,4-thiadiazole,
M.P. 179°–180° C.
(40) 2-[3-(4-chlorophenyl) ureido]-1,3,4-thiadiazole,
M.P. 242° C. (decp.)
(42) 2-isopropoxycarbonylamino-1,3,4-thiadiazole,
M.P. 186°–187° C.

These compounds show very low toxicity against mammals, for example, $LD_{50}$ of the compound (1) is 6400 mg./kg. in oral administration in mice, and that of the compound (5) is 2900 mg./kg. The toxicity to fish of these compounds are also very low, e.g. TLm (median Tolerance Limit) of the compound (1) against Oryzias Latipes is larger than 10 p.p.m., and that of the compound (5) is than 10 p.p.m., and that of the compound (27) is larger than 10 p.p.m.

The above mentioned 2-amino-1,3,4-thiadiazole compounds are prepared, for example, by the following methods.

(A) Compounds (5) to (13), (15) to (16) and (28) to (30): may be obtained by a conventional acylation of the free 2-amino-1,3,4-thiadiazole.

(B) Compounds (14), (31) to (35) and (41): may be obtained by a reaction of a 2-amino-1,3,4-thiadiazole with alkyl chloroformates or phenyl chloroformates in the presence of a base, respectively.

(C) Compound (19): may be obtained by a reaction of a 2-amino-1,3,4-thiadiazole hydrochloride with a sodium cyanate.

(D) Compounds (20) and (40): may be obtained by a reaction of a 2-amino-1,3,4-thiadiazole with an isocyanate.

(E) Compounds (21), (36) and (37): may be obtained by a reaction of a 2-amino-1,3,4-thiadiazole with an isothiocyanate.

(F) Compound (25): may be obtained by heating a 2-amino-1,3,4-thiadiazole in an ethyl orthoformate.

(G) Compound (26): may be obtained by a reaction of a 2-amino-1,3,4-thiadiazole with a phosgene.

(H) Compound (27) may be obtained in such a manner as the following: To a solution of 10.1 parts by weight of 2-amino-1,3,4-thiadiazole dissolved in 60 parts by volume of concentrated hydrochloric acid is added 1.8 parts by weight of paraformaldehyde. After left standing for a whole day and night under stirring at a room temperature, the reaction mixture is subjected to distillation under reduced pressure to remove concentrated hydrochloric acid. The residue is dissolved in water and the resulting solution is neutralized by an aqueous solution of sodium hydroxide to obtain of the objective compound (27) in a crystalline form. (Yield 89.)

The composition of this invention may be applied to plants in any suitable manner. For example, depending on specific purposes, the compound of the Formula I or a salt thereof can be directly applied itself as a fungicide, but it is preferably put into use in such a composition form as a solution, suspension or emulsion in a suitable liquid carrier, or as a solid mixture with a suitable carrier (e.g. a diluent or an adjuvant), the solid mixture being prepared by admixing the finely pulverized ingredients or by having the compound adsorbed on a suitable solid carrier. On preparation of said composition, there may be used, together with or as a part of carrier, such adjuvants as an emulsifier a suspension aid, a dispersing agent, a spreader, a penetrating agent, a wetting agent, and a stabilizer. The fungicides of the present invention may be applied in the form of, for example, solutions, emulsions, wettable powders, dusts, tablets, granules, aerosols, etc.

The preferred liquid carriers to be employed in this invention include, for example, alcohols (e.g. methyl alcohol, ethyl alcohol and ethylene glycol), ketones (e.g. acetone and methylethyl ketone), aliphatic hydrocarbons (e.g. gasoline, kerosene, and machine oil), aromatic hydrocarbons (e.g. benzene, xylene and methylnaphthalene), halogenated hydrocarbons (e.g. chloroform and carbon tetratetrachloride) acid amides (e.g. dimethyl formamide) esters (e.g. ethyl acetate), nitriles (e.g. acetonitrile), These liquid carriers may be used either singly or as a mixture of two or more thereof.

The solid carriers are exemplified by vegetable powder, tobacco powder, wheat powder and wood powder), mineral powders (e.g. kaolin, bentonite, acid clay, talc, agalmatolite powder, diatomaceous earth, mica powder, alumina, sulfur powder, activated carbon). Those solid carriers may be used either singly or in combination.

Surface active agents which can be used as said emulsifier, spreader, penetrating agent or dispersing agent are exemplified by soaps, the sulfuric acid esters of higher alcohols, alkanesulfonates, alkylarylsulfonates, quaternary ammonium salts, oxyalkylamines, fatty acid esters of polyhydric alcohols, and other surface active agents of polyalkylene oxide type and anhydrosorbitol type etc. Casein, gelatin, starch, alginic acid, agar, polyvinyl alcohol, cresol soap and the like, as occasion demands, may also be used for the same purpose.

A concentration of the active ingredient in the present fungicides ready for use is usually from about 0.001% to about 0.2% by weight, more preferably about 0.01% to about 0.05% by weight, in case of the liquid form (i.e. a solution, a suspension or an emulsion); while in case of the solid composition, from about 0.1% to about 10% by weight, about 1% to about 5% by weight is preferable. But, upon necessity, a composition containing at a higher or lower concentration than the above mentioned value may be put into use.

It is further possible to admix the composition of the invention so far described with other ingredients (e.g. copper fungicides, organic sulfur fungicides, organic chlorine fungicides, organophosphate fungicides, antibiotics), insecticides (e.g. organic chlorine insecticides, organophosphate insecticides, natural type insecticides), as well as acaricides, heribicides, plant growth regulators, synergistic agents, attractants, repellants, scents, plant nutrients, fertilizers and the like; these being to be construed as adjuvants or a part of the carriers in the composition of the present invention.

From a commercial and practical point of view, it is more preferable that the composition of the present invention is made in a concentrate form, which is not only compact and handy but also provides higher stability of the active ingredient in storage or transport than the composition ready for use.

Such concentrate composition may take the form of oil, emulsifiable concentrate, wettable powder, dust, tablet and granular as the case may be, and is usually prepared so as to contain from about 0.5% to about 80% by weight of the active ingredient or active ingredients relative to the concentrate composition with or without the above-mentioned adjuvants. The concentrate composition is diluted by or dissolved in the above-exemplified carriers or solvents at the practical application to the plant.

The fungicidal effect of the present composition will be illustrated by way of the following experiments and examples. In these experiments or examples as well as in the foregoing descriptions, the following abbreviations are employed: "cm." means centimeter(s), "mm." means millimeter(s), "ml." means milliliter(s), "g." means grams(s), "μg." means microgram(s), "a." means are (s), and "° C." means degree centigrade.

(In the data, the numerals (1), (2) . . . represent the compounds respectively designated by same numerals in the foregoing list of compounds.)

EXPERIMENT 1

Rice leaf blight control test

Procedure.—Kinmaze rice plants were cultivated in 9-cm. pots, 10 seedlings per pot, and a leaf blight control experiment was conducted on 25-day seedlings, 4 pots per treatment in duplicate. The uppermost unfolded leaf of each seedling was stabbed with a needle carrying a cell suspension of xanthomonas oryzae in the centerline of the blade and 2 days after inoculation, an aqueous solution or suspension of each test compound was sprayed 10 ml. per pot. Ten days after inoculation, the lengths of the diseased region that developed were measured.

Result

| Compound | Concentration (μg./ml.) | Average length of diseased region (mm.) | Phytotoxicity to the host |
| --- | --- | --- | --- |
| Control (untreated) | | 94 | — |
| (1) | 250 | 4 | — |
| (2) | 250 | 6 | — |
| (3) | 250 | 7 | — |
| (4) | 250 | 6 | — |
| (5) | 250 | 5 | — |
| (6) | 250 | 7 | — |
| (7) | 250 | 9 | — |
| (8) | 250 | 7 | — |
| (9) | 250 | 13 | — |
| (10) | 250 | 18 | — |
| (11) | 250 | 7 | — |
| (12) | 250 | 11 | — |
| (13) | 250 | 15 | — |
| (14) | 250 | 42 | — |
| (15) | 250 | 4 | — |
| (16) | 250 | 6 | — |
| (17) | 250 | 22 | — |
| (18) | 250 | 34 | — |
| (19) | 250 | 11 | — |
| (20) | 250 | 18 | — |
| (21) | 250 | 9 | — |
| (22) | 250 | 10 | — |
| (23) | 250 | 12 | — |
| (24) | 250 | 8 | — |
| (25) | 250 | 6 | — |
| (26) | 250 | 6 | — |
| (27) | 250 | 0 | — |

EXPERIMENT 2

Citrus canker control test

Procedure.—Lemon seedlings were planted in 12-cm. pots, followed by extensive pruning. After new shoots germinated, the control experiment was carried out, 10 pots per treatment. Each test compound was sprayed 10 ml./pot, and next day, the seedlings were spray-inoculated with a suspension of Xanthomonas citri. The pots were placed in a humid room at 24° C. for a day and, then, transferred to a greenhouse. After 20 days of inoculation, the diseased region per leaf were counted.

Result

| Compound | Concentration (μg./ml.) | Average number of diseased region per leaf | Phytotoxicity to the host |
| --- | --- | --- | --- |
| Control (untreated) | | 23.1 | — |
| (1) | 500 | 0.2 | — |
| (5) | 500 | 0.9 | — |
| (7) | 500 | 2.3 | — |
| (20) | 500 | 3.1 | — |
| (25) | 500 | 0.5 | — |
| (27) | 500 | 0 | — |

EXPERIMENT 3

Control test of tomato bacterial wilt

Procedure.—Tomato seedlings (Ponderosa variety) were planted in galvanized iron vats (25 x 20 cm., 15 cm. deep), 6 seedlings per vat. In the four-leaf stage, the soil in the locus of the plant was irrigated with a suspension of Pseudomonas solanacearum, 20 ml. per vat. Next day, each solution of the test compounds was sprinkled on the soil, 10 ml. per vat.

Four vats were assigned to each treatment. Ten days after inoculation, the percentages of infected seedlings were investigated.

Result

| Compound | Concentration (μg./ml.) | Percent of infected seedlings | Phytotoxicity to the host |
|---|---|---|---|
| Control (untreated) | | 96 | — |
| (1) | 1,000 | 0 | — |
| (2) | 1,000 | 4 | — |
| (6) | 1,000 | 8 | — |
| (27) | 1,000 | 4 | — |

EXPERIMENT 4

Rice leaf blight control test

Procedure.—Kinmaze rice plants were cultivated in 9-cm. pots, 10 seedlings per pot, and a leaf blight control experiment was conducted on 25-day seedlings, 4-pots per treatment in duplicate. The uppermost unfolded leaf of each seedling was stabbed with a needle carrying a cell suspension of *Xanthomonas oryzae* in the centerline of the blade, and 2 days after inoculation, 100 μg./ml. suspension of test compound (27) was sprayed 10 ml. per pot. Ten days after inoculation, the lengths of the diseased region that have developed were measured.

Result

| Compound | Concentration (μg./ml.) | Average length of diseased region (mm.) | Phytotoxicity to the host |
|---|---|---|---|
| Control (untreated) | | 108 | — |
| (27) | 100 | 2 | — |

EXPERIMENT 5

Field test of rice leaf blight control

Procedure.—Seeds of Kinmaze rice plant were sowed on May 10th, and transplanted on June 15th. Each test area was 12 m.² respectively and each treatment was conducted in triplicate. The test plants were infected seriously with *Xanthomonas oryzae* in the first 10 days of August. On 17th and 27 days of August, an aqueous solution or suspension of each test compound is sprayed in the amount of 20 liters/a. On 27th day of September, ratio of the diseased region area were searched by measuring the diseased region of a hundred-leaves test area.

Result

| Compound | Concentration (μg./ml.) | The ratio of diseased region area (percent) |
|---|---|---|
| Control (untreated) | | 37.6 |
| (1) | 250 | 6.2 |
| (27) | 250 | 1.0 |

EXAMPLE 1

A wettable powder comprising a mixture of 50% 2-amino-1,3,4-thiadiazole, 2% sodium ligninsulfonate, 3% white carbon, 5% polyoxyethylenealkylarylether and 40% clay.

Diluted 1000 to 2000 times with water; dosage 10 to 20 liters/a.

EXAMPLE 2

A water-soluble preparation comprising a mixture of 50% 2-amino-1,3,4-thiadiazole hydrochloride monohydrate 50% cane sugar.

Diluted 1000 to 2000 times with water; dosage 10 to 20 liters/a.

EXAMPLE 3

A liquid preparation comprising a mixed solution of 10% 2-amino-1,3,4-thiadiazole, 10% polyoxyethylenealkylarylether and 80% N,N'-dimethylformamide.

Diluted 300 to 500 times with water; dosage 10 to 20 liters/a.

EXAMPLE 4

A dust comprising a mixture of 3% 2-formamido-1,3,4-thiadiazole and 97% clay, dosage 300 to 500 g./a. without dilution.

EXAMPLE 5

A scattering granules comprising a mixture of 3% 2-amino-1,3,4-thiadiazole and 97% bentonite, dosage 300 to 500 g./a. without dilution.

EXAMPLE 6

A scattering granules comprising a mixture of 3% N,N'-methylene bis(2-amino-1,3,4-thiadiazole) and 97% bentonite, dosage 300 to 500 g./a. without dilution.

What is claimed is:
1. N,N'-methylene-bis-(2-amino-1,3,4-thiadiazole).

No references cited.

RICHARD J. GALLAGHER, Primary Examiner

U.S. Cl. X.R.

71—3; 260—240 G; 424—270